(12) United States Patent
Lovell et al.

(10) Patent No.: US 12,314,725 B2
(45) Date of Patent: May 27, 2025

(54) SYSTEMS AND METHODS FOR REDUCING POWER CONSUMPTION IN EMBEDDED MACHINE LEARNING ACCELERATORS

(71) Applicant: Maxim Integrated Products, Inc., San Jose, CA (US)

(72) Inventors: Mark Alan Lovell, Lucas, TX (US); Robert Michael Muchsel, Addison, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 314 days.

(21) Appl. No.: 17/232,386

(22) Filed: Apr. 16, 2021

(65) Prior Publication Data

US 2022/0334634 A1     Oct. 20, 2022

(51) Int. Cl.
  *G06F 9/38*       (2018.01)
  *G06F 1/3234*     (2019.01)
  *G06N 20/00*      (2019.01)

(52) U.S. Cl.
  CPC .......... *G06F 9/3877* (2013.01); *G06F 1/3275* (2013.01); *G06N 20/00* (2019.01)

(58) Field of Classification Search
  CPC ... G06F 9/3877; G06F 9/30032; G06F 1/3275
  See application file for complete search history.

(56) References Cited

U.S. PATENT DOCUMENTS

| | | | |
|---|---|---|---|
| 2002/0198911 A1* | 12/2002 | Blomgren | G06F 15/80 712/E9.034 |
| 2019/0026078 A1* | 1/2019 | Bannon | G06F 7/52 |
| 2019/0026237 A1* | 1/2019 | Talpes | G06N 3/063 |
| 2019/0065942 A1* | 2/2019 | Verrilli | G06N 3/045 |
| 2019/0325092 A1* | 10/2019 | Ren | G06N 3/082 |
| 2019/0347096 A1* | 11/2019 | Kim | G06F 9/30101 |
| 2020/0110604 A1* | 4/2020 | Lovell | G06N 3/045 |
| 2021/0011846 A1* | 1/2021 | Venkatesh | G06N 3/063 |
| 2021/0173646 A1* | 6/2021 | Ulrich | G06F 17/16 |
| 2021/0373895 A1* | 12/2021 | Shahim | G06F 3/0679 |

OTHER PUBLICATIONS

Andrew Tanenbaum, Structure Computer Organization, Prentice-Hall, second edition, pp. 10-12 (Year: 1984).*

* cited by examiner

*Primary Examiner* — Courtney P Spann
(74) *Attorney, Agent, or Firm* — Schwegman Lundberg & Woessner, P.A.

(57) ABSTRACT

Systems and methods reduce power consumption in embedded machine learning hardware accelerators and enable cost-effective embedded at-the-edge machine-learning and related applications. In various embodiments this may be accomplished by using hardware accelerators that comprise a programmable pre-processing circuit that operates in the same clock domain as the accelerator. In some embodiments, tightly coupled data loading first-in-first-out registers (FIFOs) eliminate clock synchronization issues and reduce unnecessary address writes. In other embodiments, a data transformation may gather source data bits in a manner that allows loading full words of native bus width to reduce the number of writes and, thus, overall power consumption.

20 Claims, 8 Drawing Sheets

300

SYSTEMS AND METHODS FOR REDUCING POWER CONSUMPTION IN EMBEDDED MACHINE LEARNING ACCELERATORS

BACKGROUND

A. Technical Field

The present disclosure relates generally to reducing computational requirements in "at-the-edge" machine-learning applications. More particularly, the present disclosure relates to systems and methods for efficiently processing large amounts of data by reducing power consumption and latency when performing complex neural network operations in embedded machine learning circuits, such as hardware accelerators and related devices.

B. Background

Machine learning applications, specifically applications of Deep Neural Networks, have made great strides over the last decade. Machine learning is now used to perform tasks as challenging and diverse as image processing (e.g., face recognition) or high-dimensional data interpretation (e.g., blood pressure trending).

Conventionally, machine learning processes are developed and trained on high-capacity, often using specialized hardware such as Application-Specific Integrated Circuits (ASICs) or highly parallel graphics accelerators (GPUs). Machine learning processes are frequently deployed on high-powered devices that afford high computing capabilities, or on general-purpose microprocessors and general-purpose microcontrollers or central processing units (CPUs). However, many embedded devices, such as battery-operated security cameras or wrist-worn smartwatches, have strict energy constraints that are incompatible with the power demands of such computing devices.

Accordingly, what is needed are systems and methods that reduce power consumption of embedded machine learning accelerators.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1:
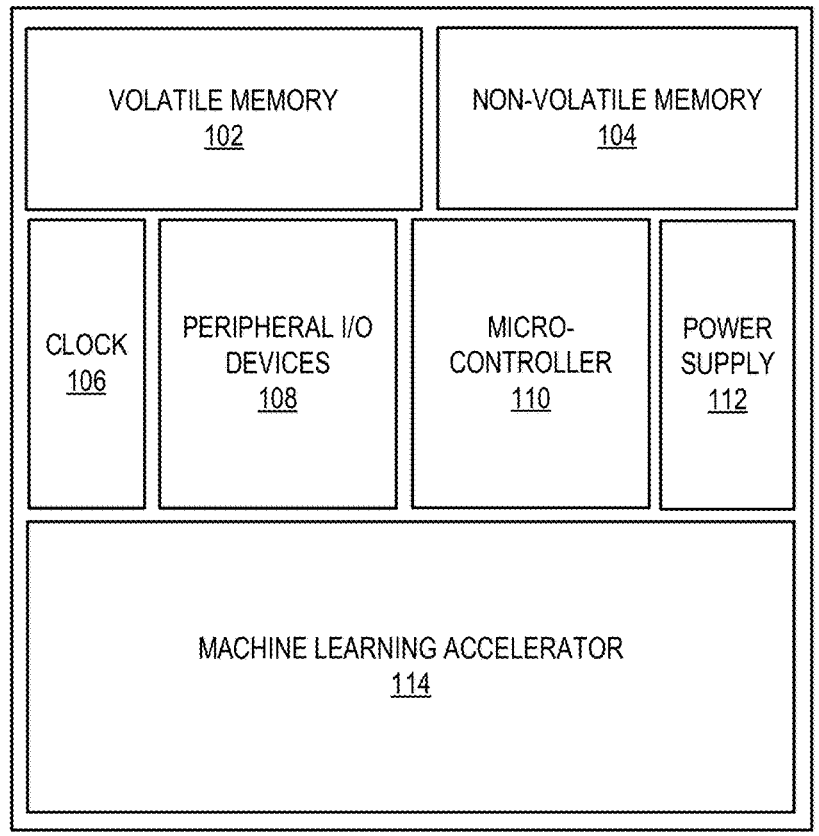
FIG. 1 is a general illustration of a typical embedded machine learning accelerator system that processes data in multiple stages.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

It shall be noted that embodiments described herein are given in the context of embedded machine learning accelerators, but one skilled in the art shall recognize that the teachings of the present disclosure are not so limited and may equally reduce power consumption in related or other devices.

In this document the terms "memory," "memory device," and "register" are used interchangeably. Similarly, the terms weight, weight parameter data, weight element, and weight parameter are used interchangeably. "Neural network" includes any neural network known in the art. The term "hardware accelerator" refers to any type of electric circuit that may be used to perform mathematical operations and related functions such as auxiliary control functions.

FIG. 1 illustrates a typical embedded machine learning accelerator system that processes data in multiple stages. System 100 contains volatile memory 102, non-volatile memory 104, clock 106, clock I/O peripherals, microcontroller 110, power supply 112, and machine learning accelerator 114. Microcontroller 110 can be a traditional DSP, machine learning accelerator 114 can be implemented as a single layer CNN accelerator that comprises hundreds of registers (not shown). As depicted in FIG. 1, machine learning accelerator 114 interfaces with other parts of embedded machine learning accelerator system 100 like any of the other components do, rather than being integrated with other components.

In operation, microcontroller 110 may optionally perform typical pre-processing steps. For example, microcontroller 110 may, in a preprocessing step in an audio application, receive input data and may apply to that input data a number of Fourier transformation operations to convert the data from a time domain to a frequency domain representation. The result of the conversion may then serve as input for machine learning accelerator 114.

Machine learning accelerator 114 typically uses weight data to perform matrix-multiplications and related convolution computations. The weight data may be unloaded from accelerator 114, for example, to load new or different weight data prior to accelerator 114 performing a new set of operations using the new set weight data, e.g., iteratively in loop as shown in FIG. 2.

Some approaches aiming to reduce power consumption when using machine learning processes on devices utilize embedded machine learning accelerators. However, such accelerators do not allow for developing systems that employ machine learning in ways that truly minimize energy consumption. This is mainly due to the lack of a holistic system design that aims at minimizes energy consumption at as many stages in the system as possible and considers that each operation that may have an energy impact. For example, data movement is heavily energy intensive, data movement over long distances, e.g., to external memory, the cloud, etc., is even more energy intensive.

Therefore, it would be desirable to not only reduce power consumption in embedded machine learning accelerators, but also make such devices and systems practical to program, debug, simulate, and deploy to enable cost-effective embedded at-the-edge machine-learning and related applications.

Figure 2:
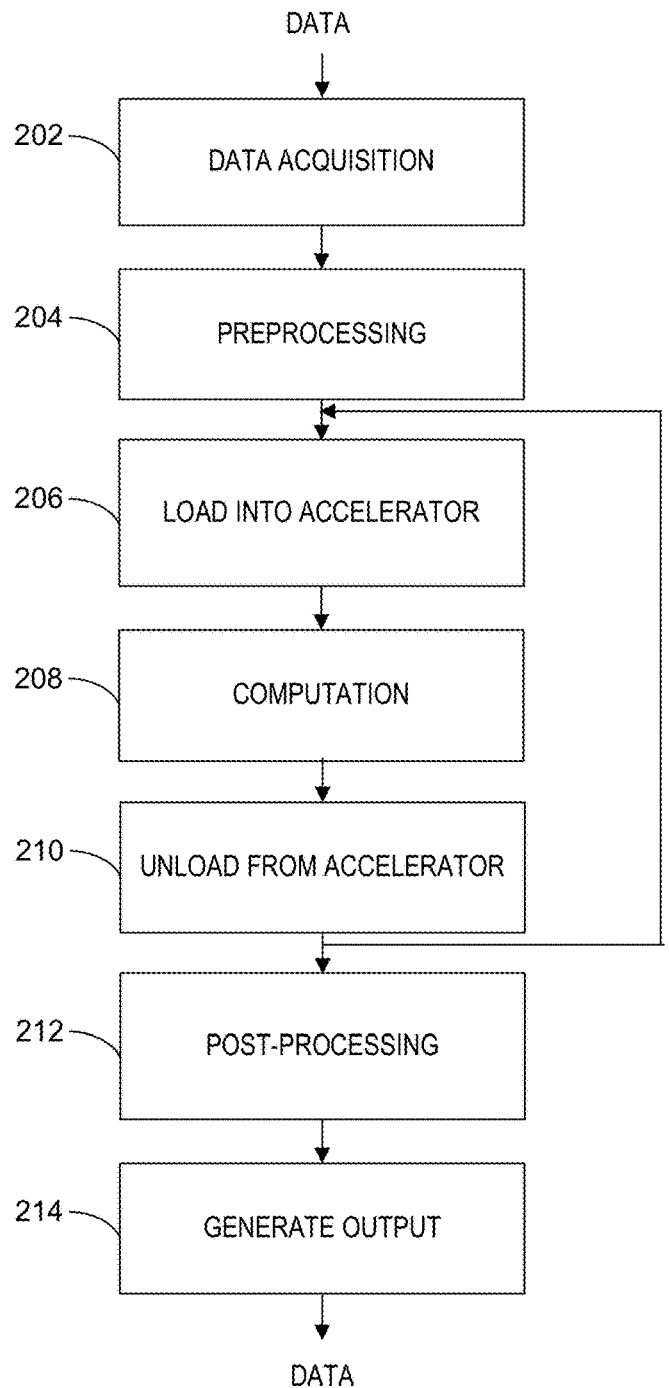
FIG. 2 illustrates common data processing stages as employed by the embedded machine learning accelerator system shown in FIG. 1.

FIG. 2 illustrates common data processing stages as employed by the embedded machine learning accelerator system shown in FIG. 1. A person of skill in the art will appreciate that while processing stages are shown as distinct blocks, FIG. 2 is merely conceptual and, in practice, considerable overlap may exist between any number of steps 202-214.

In existing designs, computation step 208 is by far the most energy intensive step, particularly, in in circumstances in which the computations are performed in software or by using power-hungry DSPs. Contrariwise, once the computation is optimized, e.g., by using custom hardware circuits, other system components become more dominant with regard to energy consumption, as illustrated in FIG. 3.

Figure 3:
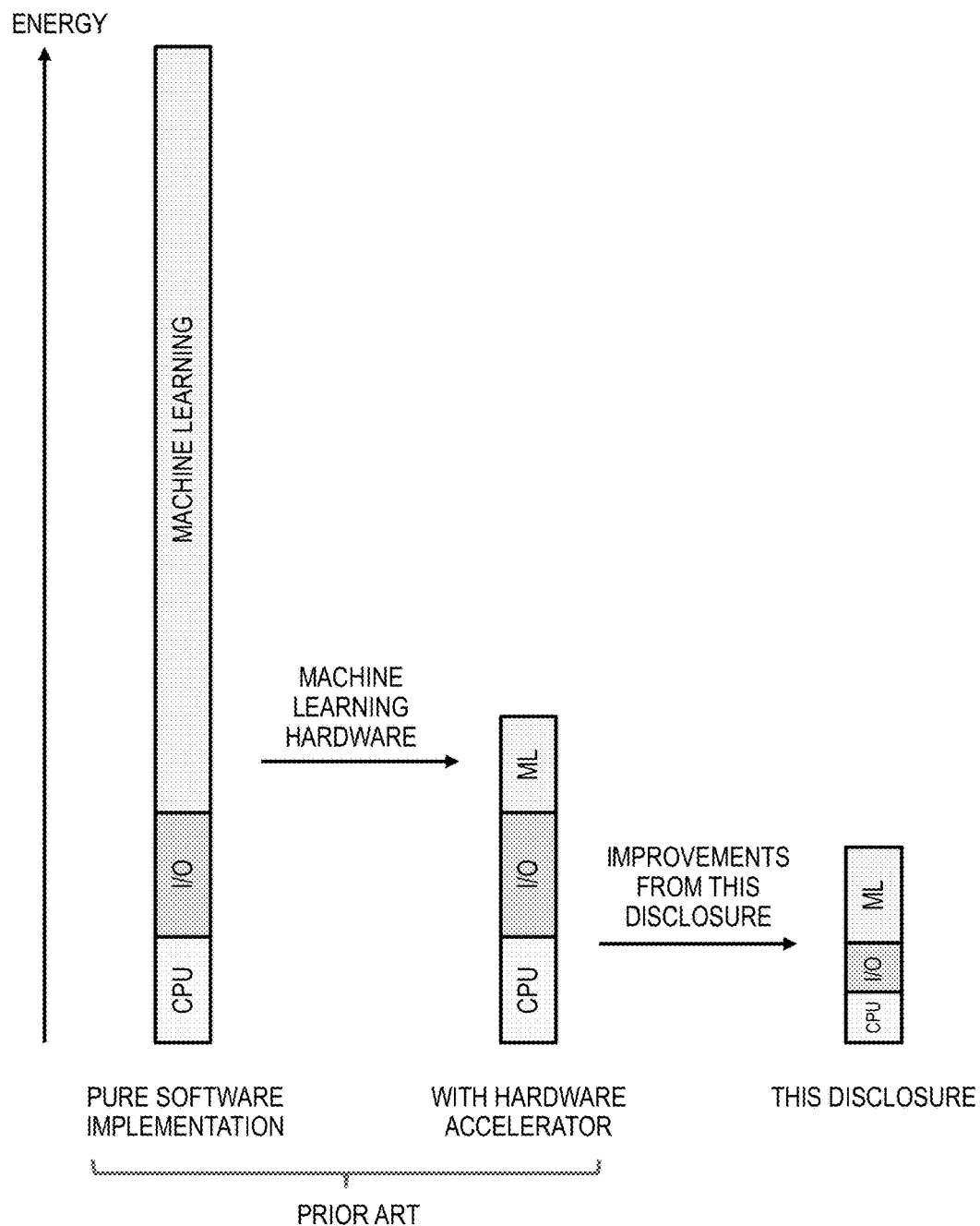
FIG. 3 is an bar graph illustrating the effect of implementing the power saving features according to various embodiments of the present disclosure when compared to the prior art.

FIG. 3 further illustrates how various embodiments presented in this document provide additional energy saving mechanisms and/or enhance usability for several portions of an embedded device that employs machine learning for both inference (i.e., the application of a previously derived process to new data) as well as training or learning (i.e., the computation of a new process, a new data structure, new connectivity, or new or modified parameters).

Since, in practice, n pieces of data require moving roughly $n^2$ pieces of data, the power consumed by actual interference operations, i.e., the energy required for performing machine learning calculations, becomes more and more negligible when compared with the energy required to move data, which conversely becomes dominant. Especially in pure software applications, repeatedly loading parameters, multiplying data, and storing the result leads to unwanted excessive power consumption.

In addition, even at periods of time when no read/write operations take place, re-loading operations are oftentimes necessary to counteract the effect of charge decay from memory devices (e.g., static RAM devices) caused by current leakage that could otherwise negatively impact data retention and overall operation.

Some existing approaches attempt to minimize such undesirable effects, for example, by employing sleep mode and similar techniques. However, the energy required to perform parameter loading and reconfiguration steps are so energy intensive that they may exceed the amount of power used to perform the actual computations that are oftentimes already optimized, at least to a certain degree.

For example, when initially configuring a machine learning accelerator, such as the one in FIG. 1, which uses volatile memory or registers, or when re-configuring the machine learning accelerator after a wake-up operation from a sleep or suspended state, some or all of the configuration information must be re-loaded from non-volatile storage into the accelerator's volatile memories. It is understood that this information comprises not only the machine learning network structure but also weight parameters, which may be of significant size (e.g., several megabytes), and also parameters that determine which operations to perform and in which sequence, or any number of other constraints such as, e.g., constraints that may have been learned or otherwise obtained in connection with a training session.

Existing systems such as system 100 in FIG. 1 employ an address/data mechanism, wherein a CPU repeatedly executes load instructions and stores instructions for each weight parameter, its associated source, and target address. Since the format of weight parameters oftentimes comprises multiples of odd byte sizes, such as 3×3 bytes or 7×7 bytes, the addresses of subsequent weight elements may, thus, not necessarily be contiguous, may not be derived by a simple addition operation, and may not lend themselves to simple bock move operations.

Further, individual weight sizes may differ on a case-by-case basis. Furthermore, weight sizes may not necessarily be aligned with, aligned to, or multiples of, a native system or a common bus word size (e.g., 32-bit or 64-bit), which may cause, among other things, a significant increase in startup or wakeup times.

In short, the formats of weight parameters stored in common memory are not suitable for efficient processing on commonly available hardware. The resulting increase in latency unnecessarily increases power consumption, which is critical in applications such as those for battery-operated devices. In this context, latency applies to time delays that may be attributed to transfer and operation functions of common memory devices, including control and data movement operations, such as read and write operations, in the data path. Therefore, even if loading and configuration processes are performed with a relatively low duty cycle (e.g., every 5 minutes following a wake-up operation), a significant amount of battery power drain can be attributed to non-computational operations, thus, greatly decreasing efficiency and increasing power consumption. In many battery-driven applications that rely on external power, such outcomes are not acceptable.

Therefore, to facilitate rapid and energy-efficient loading and re-loading, it would be beneficial to have mechanisms and hardware that optimizes weight loading and configuration steps in machine learning applications in a manner such as to reduce overall power consumption of machine learning processes. Assuming that only 10 percent of about 5 Billion calculation operations, each requiring 5 picojoules energy, can be saved by using various embodiments presented herein, it becomes apparent that the resulting power savings for many embedded at-the-edge machine-learning and related applications are significant.

Figure 4:
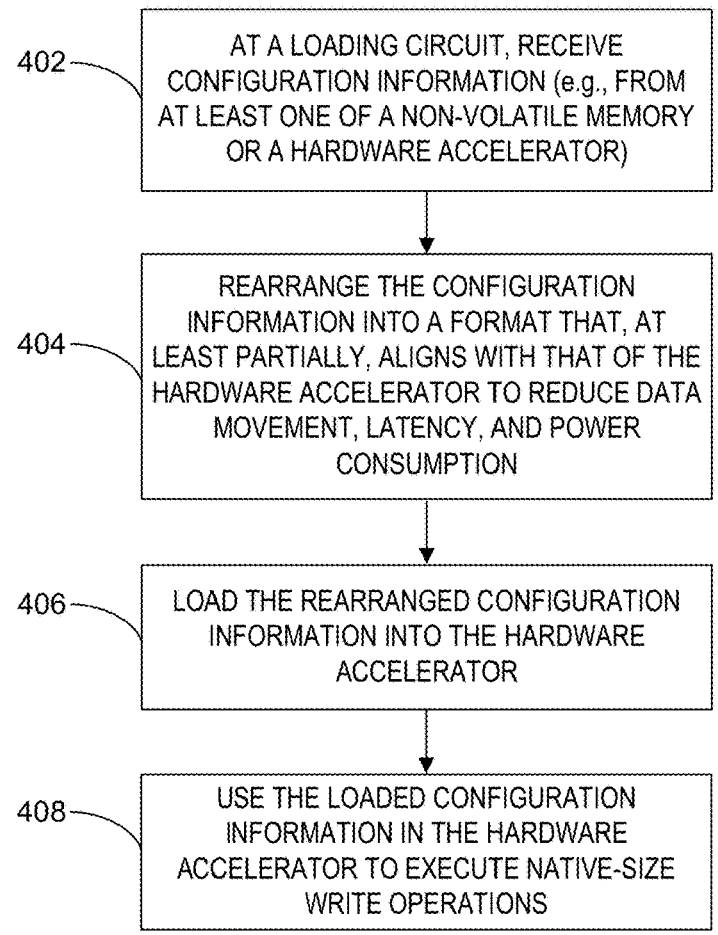
FIG. 4 illustrates a process for reducing in power consumption of embedded machine learning accelerators according to various embodiments of the present disclosure.

FIG. 4 illustrates a process for reducing in power consumption of embedded machine learning accelerators according to various embodiments of the present disclosure. In embodiments, process 400 for reducing in power consumption in embedded machine learning accelerators may be implemented by utilizing a hardware function that performs certain steps that may start when, e.g., after a power-up sequence, a loading circuit obtains (402) an amount of configuration information (e.g., configuration data), such as weight parameter data that may have been stored in a data store, such as a memory device (e.g., non-volatile memory, Flash memory). In embodiments, to-be-loaded configuration parameters may have been efficiently stored in a format that corresponds to units of power of two (e.g., 64 KB) and in a compact manner without using filler bits between configuration parameters. It is understood that the loading circuit may further obtain one or more control commands, e.g., from computing devices in a network. For example, a common volatile memory device coupled to non-volatile memory may send a command to a hardware accelerator to relinquish control to the loading circuit or any other node in the data path.

In embodiments, the loading circuit may partition, reorganize, and/or rearrange (404) configuration parameter data obtained from the non-volatile memory device into a new format, such as blocks of a certain size blocks (e.g., 72-bit blocks), i.e., sizes that do not conform to the units of power of two and that may comprise filler gaps, e.g., to reduce data movement, latency and, thus, power consumption.

Suitable block sizes for the configuration parameter data that are to-be-loaded into a hardware accelerator (e.g., hardware accelerator 508 in FIG. 5, which differs from common memory devices) may comprise any size that accommodates formats of weight parameters, e.g., n×n bytes, where n is a prime number or any other number that aligns with a size associated with the type and architecture of memory used by the hardware accelerator. It is understood that any other sizes that align with the architecture of the hardware accelerator may be used.

In embodiments, one-dimensional addresses with no filler bits may be converted to a two-dimensional representation of the data, e.g., two-dimensional addresses, that do have filler bits. In embodiments, any number of filler bits, e.g., bits that may have been removed during training, may be dynamically added to each block.

In embodiments, the loading circuit may load (406) the reorganized data into the hardware accelerator using the format of the hardware accelerator, for example, by using an auto-incrementing source and/or target address that is configured once for each weight block and is automatically increased to the next addresses based on the location of the currently loaded weight within the configured machine learning network.

In embodiments, the movement of configuration parameters from data storage to the hardware accelerator may be optimized by utilizing configuration parameter information to facilitate rapid address transfer/mapping, e.g., from a one-dimensional data structure to a two-dimensional one, and by using feedback from the configuration data to control the addresses.

In embodiments, using local parameters consummate with the internal organization of the hardware accelerator, especially local memory, instead of, e.g., sequentially processing addresses further reduces latency and improves energy efficiency.

Finally, the loaded data may be used to execute (408) native-size write operations. It is noted that process 400 for reducing in power consumption is agnostic to the type of application, the type of mathematical operations, etc., and does not negatively impact other operations, such as parallel processing parallel operations, of devices such as hardware accelerators.

Advantageously, arranging and combining weight bits in the weight parameter data in a manner such that native-size write operations can be executed enables a low-latency data path and/or optimized bridge for DMA or CPU to target write operations that, in turn, enable the type of accelerator-friendly convolution computations used in machine learning processes. In addition, by reducing data movement, advantageously, latency and power consumption are further reduced.

One skilled in the art shall recognize that herein (1) certain steps may optionally be performed; (2) steps may not be limited to the specific order set forth herein; (3) certain steps may be performed in different orders; and (4) certain steps may be done concurrently.

Figure 5:
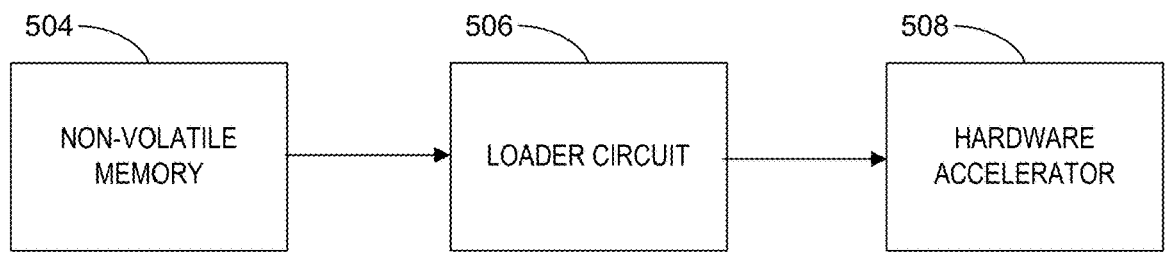
FIG. 5 is an exemplary block diagram of an illustrative system comprising a hardware accelerator loading system according to various embodiments of the present disclosure.

FIG. 5 is an exemplary block diagram of an illustrative system comprising a hardware accelerator loading system according to various embodiments of the present disclosure. In embodiments, system 500 may comprise memory 504, loader circuit 506, and hardware accelerator 508. It is notes that the exemplary hardware accelerator system and circuit illustrated in FIG. 5 and FIG. 6, respectively, are not limited to the constructional detail shown there or described in the accompanying text. As those skilled in the art will appreciate, additional or different components may be used to accomplish the objectives of the present disclosure. For example, memory 504 may be embedded in a CPU that is coupled to loader circuit 506.

In embodiments, memory 504 stores and provides to loader circuit 506 parameters, such as weight parameters that, e.g., may have been stored in sequential form. In embodiments, hardware accelerator 508 may comprise parameters that have been pre-configured prior to an inference operation. The parameters may have been obtained, e.g., during training of a neural network.

In embodiments, loader circuit 506 obtains from hardware accelerator 508 configuration data that is associated with hardware accelerator 508 and dynamically uses such data to determine where and how much configuration data should be processed in hardware accelerator 508, e.g., until a stop condition is reached.

As previously mentioned, the architecture of hardware accelerator 508 may be different from that of memory 504 or the CPU that memory 504 is embedded in. For example, the bus word size of hardware accelerator 508 may be different from the typical 32-bit or 64-bit bus word size of the CPU or memory 504. Instead, the architecture of hardware accelerator 508 may be optimized to efficiently perform computations on various sizes of data that do not nicely align with the sizes found in common memory devices.

It is known that once a hardware accelerator has been configured, it may perform computations on one or more sets of input data. In neural network processing applications, it is sometimes necessary to pre-process the input data prior to executing an inference step. Such pre-processing steps are typically application-specific and may occur more or less frequently. For example, a camera application may benefit from a gain correction or color correction to adjust for sensor-dependent variations. Similarly, an audio application may benefit from a frequency transformation that is applied to audio samples. Such corrections involve the processing of new data that can be loaded through some interface, e.g., a register interface.

In existing systems when a set of input data has been acquired and has optionally been pre-processed, the input data is typically loaded into a machine learning accelerator before the accelerator commences computations. Such systems oftentimes use a simple register interface on a CPU bus or a target for Direct Access Memory (DMA) operations. In general, such interfaces are not synchronized with the machine learning accelerator and may require an address/data pair for every write.

In addition, input data size typically does not match the native bus size, leading to slow and inefficient data loading due to clock synchronization delays and due to the overhead that is needed for adding addresses to each data word.

To address these shortcomings, various embodiments herein provide optimized hardware accelerator implementations that may comprise (1) a programmable pre-processing circuit that operates in the same clock domain as the accelerator, (2) tightly coupled data loading first-in-first-out registers (FIFOs) that eliminate clock synchronization issues and reduce unnecessary address writes, and (3) a data transformation that gathers source data bits in such a manner that allows loading full words (of native bus width) to reduce the number of writes.

Figure 6:
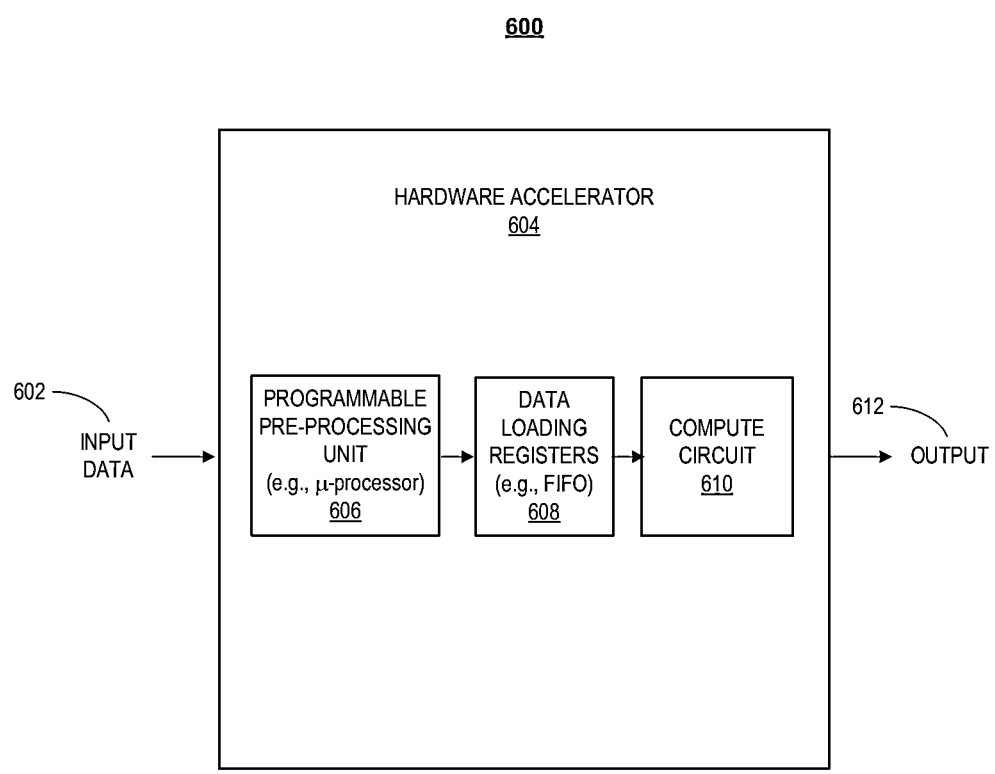
FIG. 6 is an exemplary block diagram illustrating an exemplary hardware accelerator according to various embodiments of the present disclosure.

FIG. 6 is an exemplary block diagram illustrating an exemplary hardware accelerator according to various embodiments of the present disclosure. In embodiments, hardware accelerator 604 may comprise pre-processing circuit 606, data loading register 608 that may be implemented as FIFOs, and compute circuit 610.

In operation, pre-processing circuit 606 may perform computations and write to data loading register 608. In embodiments, pre-processing circuit 606 may be implemented as a flexible and fully programmable pre-processing circuit, such as a core similar to a relatively small microcontroller or microprocessor that is embedded into hardware accelerator 604. Advantageously, this approach allows a relatively larger system microcontroller or system microprocessor (not shown in FIG. 6) to shut down during data loading or pre-processing operations to conserve power.

In embodiments, pre-processing circuit 606 may transform, adjust, or otherwise modify some or all of input data 602, for example, by performing task such as flipping bits, reordering incoming input data 602 to perform data correction and similar steps, as previously mentioned. As depicted in FIG. 6, in embodiments, microprocessor 606 may be embedded into hardware accelerator 604, such that both may share the same clock domain and/or power domain, i.e., without using a high-powered CPU. Advantageously, embodiments herein decrease latency since read and write operations require fewer processing cycles to complete, such that compute circuit 610 can access and process data more rapidly, e.g., to perform inference operations, thereby, significantly reducing power consumption.

In embodiments, hardware accelerator 604 may comprise pre-processing circuit 606, and data loading registers 608 may communicate with hardware accelerator 604 in the same time domain. Tightly coupled data loading registers 608 that operate in the same clock domain as hardware accelerator 604 advantageously reduce clock synchronization issues and further reduce unnecessary address writes.

In embodiments, pre-processing circuit 606 and data loading register 608 may work together to assemble words such as to generate full word widths that align with the data width of compute circuit 610, e.g., for a native bus width. Advantageously, this reduces the number of operations and data moves that hardware accelerator 604 performs, thereby, reducing power consumption when compared with common power-hungry CPUs.

In embodiments, pre-processing circuit 606 may communicate with peripheral devices (not shown in FIG. 6) that provide input data 602 to request and/or obtain adjustments to input data 602 from such devices, e.g., to reduce the amount of pre-processing that the pre-processing circuit 606 performs. It is understood that pre-processing circuit 606 may interface and communicate with any type of devices, such as sensors (e.g., humidity sensor), using any communications protocol known in the art.

In embodiments, processing circuit 606 may perform any type of data manipulation to reduce pre-processing times, resulting in additional power savings. For example, pre-processing circuit 606 may be programmed to recognize various sensor types and make adjustments, or request adjustments from a device, e.g., based on the source of input data 602, including manufacturer information, model number, device parameter settings, temporal information, and other parameters, e.g., prior to aligning input data 602 to compute circuit 610.

Figure 7:
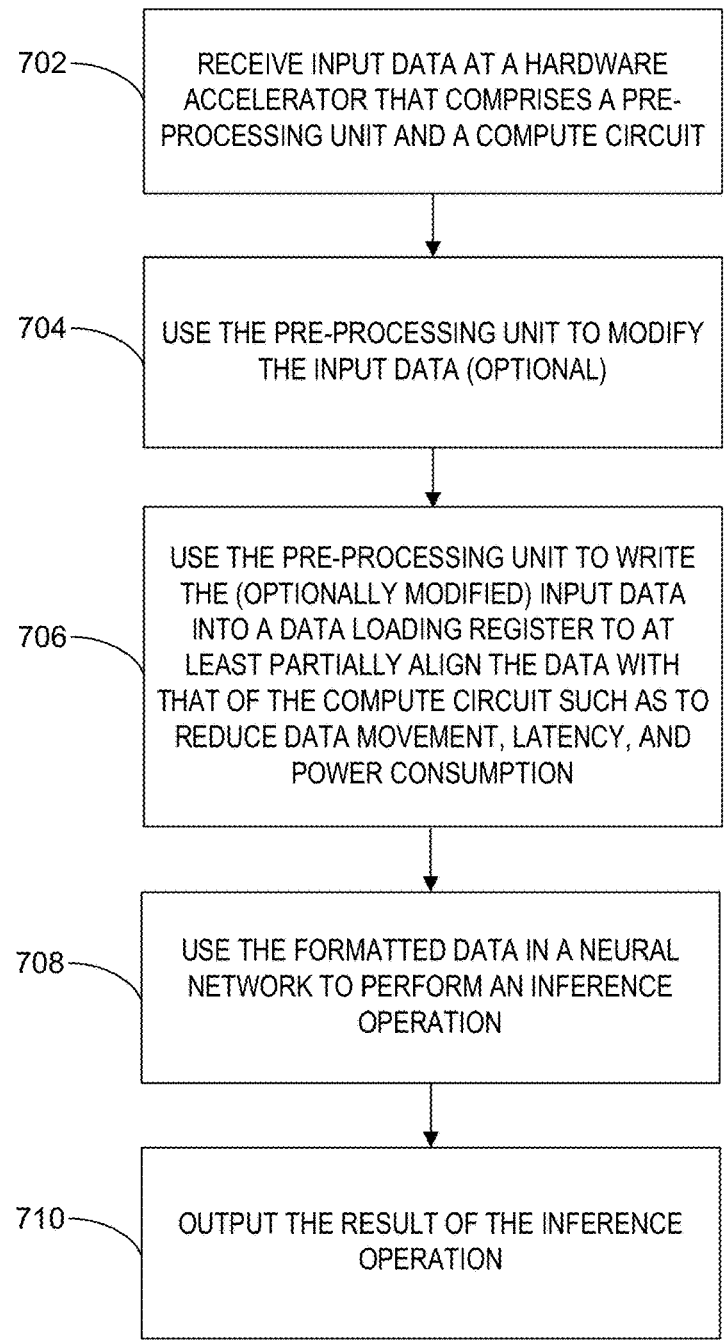
FIG. 7 is a flowchart of an illustrative process for reducing power consumption in accordance with various embodiments of the present disclosure.

FIG. 7 is a flowchart of an illustrative process for reducing power consumption in accordance with various embodiments of the present disclosure. In embodiments, process 700 may begin when input data, e.g., sensor, image, or audio data, is received (702) at a hardware accelerator (e.g., hardware accelerator 604 shown in FIG. 6) that may comprise a pre-processing unit (e.g., programmable pre-processing unit 606 shown in FIG. 6) and a compute circuit (e.g., compute circuit 610 shown in FIG. 6).

In embodiments, the pre-processing unit may be used (704) to modify, reorder, clean, reconfigure or otherwise manipulate the input data, e.g., to perform a gain correction, frequency transformation, and the like on the input data.

In embodiments, the pre-processing unit may be used to write (706) the modified input data into a data loading register to at least partially align the data with that of the compute circuit to reduce data movement, latency, and power consumption.

In embodiments, the compute circuit may use the formatted data in a neural network model, e.g., to perform an inference operation (708).

Finally, the hardware accelerator may output (710) the result of the inference operation or related operation.

Figure 8:
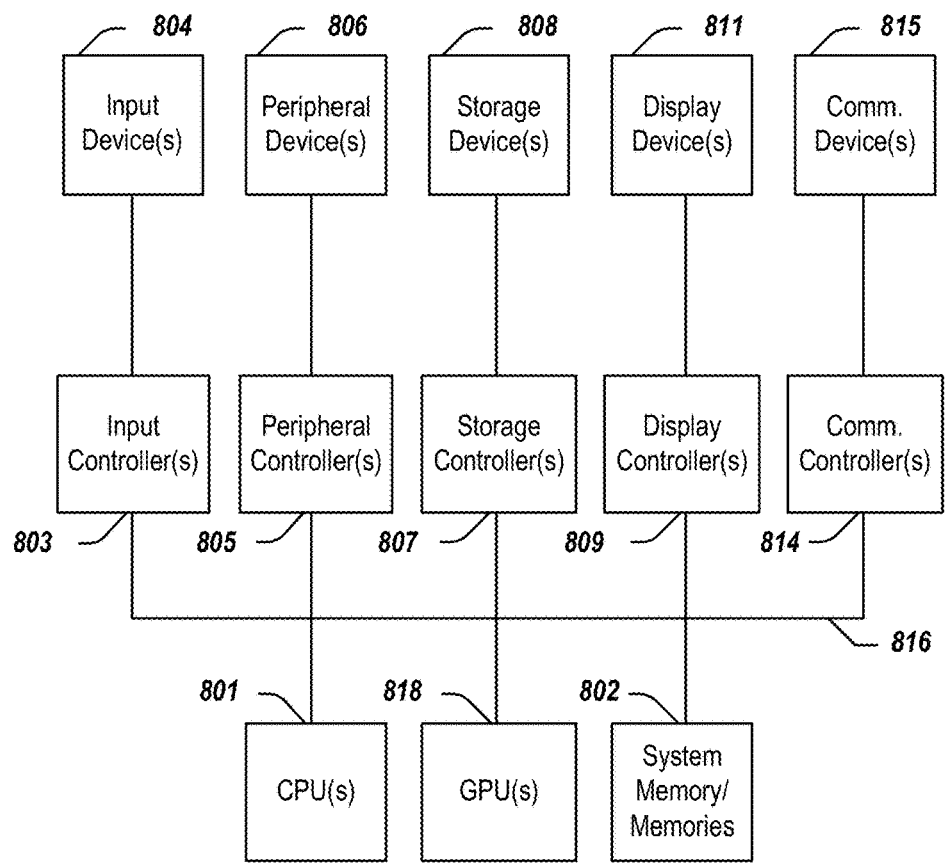
FIG. 8 depicts a simplified block diagram of a computing device/information handling system, in accordance with embodiments of the present disclosure.

FIG. 8 depicts a simplified block diagram of an information handling system (or computing system) according to embodiments of the present disclosure. It will be understood that the functionalities shown for system 800 may operate to support various embodiments of a computing system— although it shall be understood that a computing system may be differently configured and include different components, including having fewer or more components as depicted in FIG. 8.

As illustrated in FIG. 8, the computing system 800 includes one or more CPUs 801 that provides computing resources and controls the computer. CPU 801 may be implemented with a microprocessor or the like, and may also include one or more graphics processing units 819 and/or a floating-point coprocessor for mathematical computations. System 800 may also include a system memory 802, which may be in the form of random-access memory (RAM), read-only memory (ROM), or both.

A number of controllers and peripheral devices may also be provided, as shown in FIG. 8. An input controller 803 represents an interface to various input device(s) 804, such as a keyboard, mouse, touchscreen, and/or stylus. The computing system 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present disclosure. Storage device(s) 808 may also be used to store processed data or data to be processed in accordance with the disclosure. The system 800 may also include a display controller 809 for providing an interface to a display device 811, which may be a cathode ray tube (CRT), a thin film transistor (TFT) display, organic light-emitting diode, electroluminescent panel, plasma panel, or other type of display. The computing system 800 may also include one or more peripheral controllers or interfaces 805 for one or more peripherals 806. Examples of peripherals may include one or more printers, scanners, input devices, output devices, sensors, and the like. A communications controller 814 may interface with one or more communication devices 815, which enables the system 800 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. Processed data and/or data to be processed in accordance with the disclosure may be communicated via the communications devices 815. For example, loader circuit 506 in FIG. 5 may receive configuration information from one or more communications devices 815 coupled to communications controller 814 via bus 816.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as ASICs, programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as ASICs, PLDs, flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for reducing power consumption in an embedded machine learning hardware accelerator, the method comprising:
   obtaining from a memory device data having a first format;
   arranging the data into a second format associated with a hardware accelerator architecture configured to enable native-size data processing and configured to reduce power consumption of the hardware accelerator architecture by reducing at least one of a number of read operations or a number of write operations performed by the hardware accelerator architecture, wherein the data comprises configuration data; and
   loading the arranged data into the hardware accelerator architecture to facilitate the native-size data processing by using the configuration data to identify a first target address that is configured for a first subset of arranged data, within the arranged data to be loaded, and is increased to a second target address corresponding to a second subset of arranged data, within the arranged data to be loaded, the first target address and the second target address being associated by the configuration data.

2. The method according to claim 1, wherein the configuration data comprises weight parameters.

3. The method according to claim 2, wherein the hardware accelerator architecture parallelly processes the weight parameters in local memory to reduce latency.

4. The method according to claim 2, wherein loading the arranged data into the hardware accelerator architecture comprises incrementing at least one of a source address or a target address based on a location of a weight parameter that has been loaded into the hardware accelerator architecture.

5. The method according to claim 4, wherein at least one of the source address or the target address for each weight block, once configured, is reused at least two times.

6. The method according to claim 1, wherein the first format comprises a data structure that can be expressed in units of power of two and the second format comprises an N×N data structure, where N is a prime number.

7. The method according to claim 1, further comprising, performing a conversion from a one-dimensional data structure to a two-dimensional data structure that is associated with the hardware accelerator architecture.

8. The method according to claim 7, further comprising utilizing configuration parameter information to facilitate the conversion.

9. The method according to claim 1, wherein the second format comprises data blocks that comprise filler bits that have been removed in a training phase, and the first format comprises data blocks that do not.

10. The method according to claim 9, wherein arranging configuration data into the second format comprises dynamically adding one or more filler bits to one or more of the data blocks.

11. A system for reducing power consumption in embedded machine learning hardware accelerators, the system comprising:
   a memory device;
   a loader circuit coupled to the memory device to receive data that comprises a first format, the loader circuit rearranges the data into a second format associated with a hardware accelerator architecture configured to enable native-size data processing and configured to reduce power consumption by reducing at least one of a number of read operations or a number of write operations, wherein the data comprises configuration data; and
   a hardware accelerator that is configured to receive the rearranged data and execute native-size write operations, wherein the configuration data identifies a first target address that is configured for a first subset of arranged data, within the arranged data to be loaded, and is increased to a second target address corresponding to a second subset of arranged data, within the arranged data to be loaded, the first target address and the second target address being associated by the configuration data.

12. The system of claim 11, wherein the configuration data comprises weight parameters.

13. The system of claim 12, wherein the hardware accelerator parallelly processes the weight parameters in local memory to reduce latency.

14. The system of claim 11, further comprising a preprocessor that modifies the input data prior to the loader circuit receiving the input data.

15. The system according to claim 11, wherein the loader circuit comprises a set of data loading registers.

16. The system of claim 11, further comprising a compute circuit that uses the rearranged data in a neural network to perform convolution operations to output a result.

17. The system of claim 11, wherein the first format comprises a data structure that can be expressed in units of power of two and the second format comprises an N×N data structure, where N is a prime number.

18. The system of claim 11, the second format comprises data blocks that comprise filler bits that have been removed in a training phase, and the first format comprises data blocks that do not.

19. The system of claim 18, wherein arranging configuration data into the second format comprises dynamically adding one or more filler bits to one or more of the data blocks.

20. The system of claim 11, further comprising, performing a conversion from a one-dimensional data structure to a two-dimensional data structure that is associated with the hardware accelerator.

* * * * *